US010326166B2

(12) United States Patent
Yang et al.

(10) Patent No.: US 10,326,166 B2
(45) Date of Patent: Jun. 18, 2019

(54) GEL ELECTROLYTES AND PRECURSORS THEREOF

(71) Applicant: GM GLOBAL TECHNOLOGY OPERATIONS LLC, Detroit, MI (US)

(72) Inventors: Li Yang, Troy, MI (US); Mei Cai, Bloomfield Hills, MI (US); Martin S. Ruthkosky, Sterling Heights, MI (US); Bing Li, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 261 days.

(21) Appl. No.: 15/237,378

(22) Filed: Aug. 15, 2016

(65) Prior Publication Data
US 2018/0048022 A1    Feb. 15, 2018

(51) Int. Cl.
| | | |
|---|---|---|
| *H01M 10/0565* | (2010.01) | |
| *H01M 4/134* | (2010.01) | |
| *H01M 4/38* | (2006.01) | |
| *H01M 4/48* | (2010.01) | |
| *H01M 10/0525* | (2010.01) | |
| *H01M 4/02* | (2006.01) | |

(52) U.S. Cl.
CPC ....... *H01M 10/0565* (2013.01); *H01M 4/134* (2013.01); *H01M 4/386* (2013.01); *H01M 4/483* (2013.01); *H01M 10/0525* (2013.01); *H01M 2004/027* (2013.01); *H01M 2300/0085* (2013.01)

(58) Field of Classification Search
None
See application file for complete search history.

(56) References Cited

U.S. PATENT DOCUMENTS

| 7,736,805 B2 | 6/2010 | Nazri et al. |
| 8,101,152 B1 | 1/2012 | Halalay et al. |
| 8,399,138 B2 | 3/2013 | Timmons |
| 8,420,259 B2 | 4/2013 | Xiao et al. |

(Continued)

FOREIGN PATENT DOCUMENTS

| CN | 1558463 | 12/2004 |
| CN | 202025833 | 11/2011 |

(Continued)

OTHER PUBLICATIONS

Wu et al., "Stable cycling of double-walled silicon nanotube battery anodes through solid-electrolyte interphase control" *Nature Nanotechnology.* vol. 7, pp. 310-315 (Mar. 25, 2012); doi: 10.1038/nnano.2012.35.

(Continued)

*Primary Examiner* — Tracy M Dove
(74) *Attorney, Agent, or Firm* — Harness, Dickey & Pierce, P.L.C.

(57) ABSTRACT

An example of a gel electrolyte precursor includes a lithium salt, a solvent, a fluorinated monomer, a fluorinated cross-linker, and an initiator. Another example of a gel electrolyte precursor includes a lithium salt, a solvent, and a fluorinated monomer, wherein the fluorinated monomer is methyl 2-(trifluoromethyl) acrylate, tert-butyl 2-(trifluoromethyl)acrylate, or a combination thereof. A gel electrolyte formed from either gel electrolyte precursor may be incorporated into a lithium-based battery.

13 Claims, 1 Drawing Sheet

(56) References Cited

U.S. PATENT DOCUMENTS

| | | |
|---|---|---|
| 8,440,350 B1 | 5/2013 | Verbrugge et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,828,481 B2 | 9/2014 | Burton et al. |
| 8,835,056 B2 | 9/2014 | Xiao et al. |
| 9,012,075 B2 | 4/2015 | Verbrugge et al. |
| 9,034,519 B2 | 5/2015 | Xiao et al. |
| 9,093,705 B2 | 7/2015 | Xiao et al. |
| 9,142,830 B2 | 9/2015 | Xiao et al. |
| 9,153,819 B2 | 10/2015 | Huang et al. |
| 9,356,281 B2 | 5/2016 | Verbrugge et al. |
| 9,362,551 B2 | 6/2016 | Sachdev et al. |
| 9,362,552 B2 | 6/2016 | Sohn et al. |
| 9,379,374 B2 | 6/2016 | Liu et al. |
| 9,583,767 B2 | 2/2017 | Verbrugge et al. |
| 2008/0020275 A1* | 1/2008 | Koh .................. C08J 5/20 429/189 |
| 2012/0100403 A1 | 4/2012 | Wang et al. |
| 2012/0229096 A1 | 9/2012 | Nazri |
| 2012/0328927 A1 | 12/2012 | Timmons et al. |
| 2013/0099159 A1 | 4/2013 | Halalay et al. |
| 2014/0220452 A1 | 8/2014 | Yu et al. |
| 2016/0104918 A1 | 4/2016 | Wang |
| 2017/0098817 A1 | 4/2017 | Yu et al. |
| 2017/0125868 A1* | 5/2017 | Kim .................. H01M 10/0525 |

FOREIGN PATENT DOCUMENTS

| | | |
|---|---|---|
| CN | 107768716 A | 3/2018 |
| DE | 102017214200 A1 | 2/2018 |
| WO | WO2015/017418 | 2/2015 |

OTHER PUBLICATIONS

Etacheri, et al.; "Effect of fluoroethylene carbonate (FEC) on the performance and surface chemistry of si-nanowire li-ion battery anodes"; Langmuir; 2011; vol. 28; pp. 965-976.

* cited by examiner

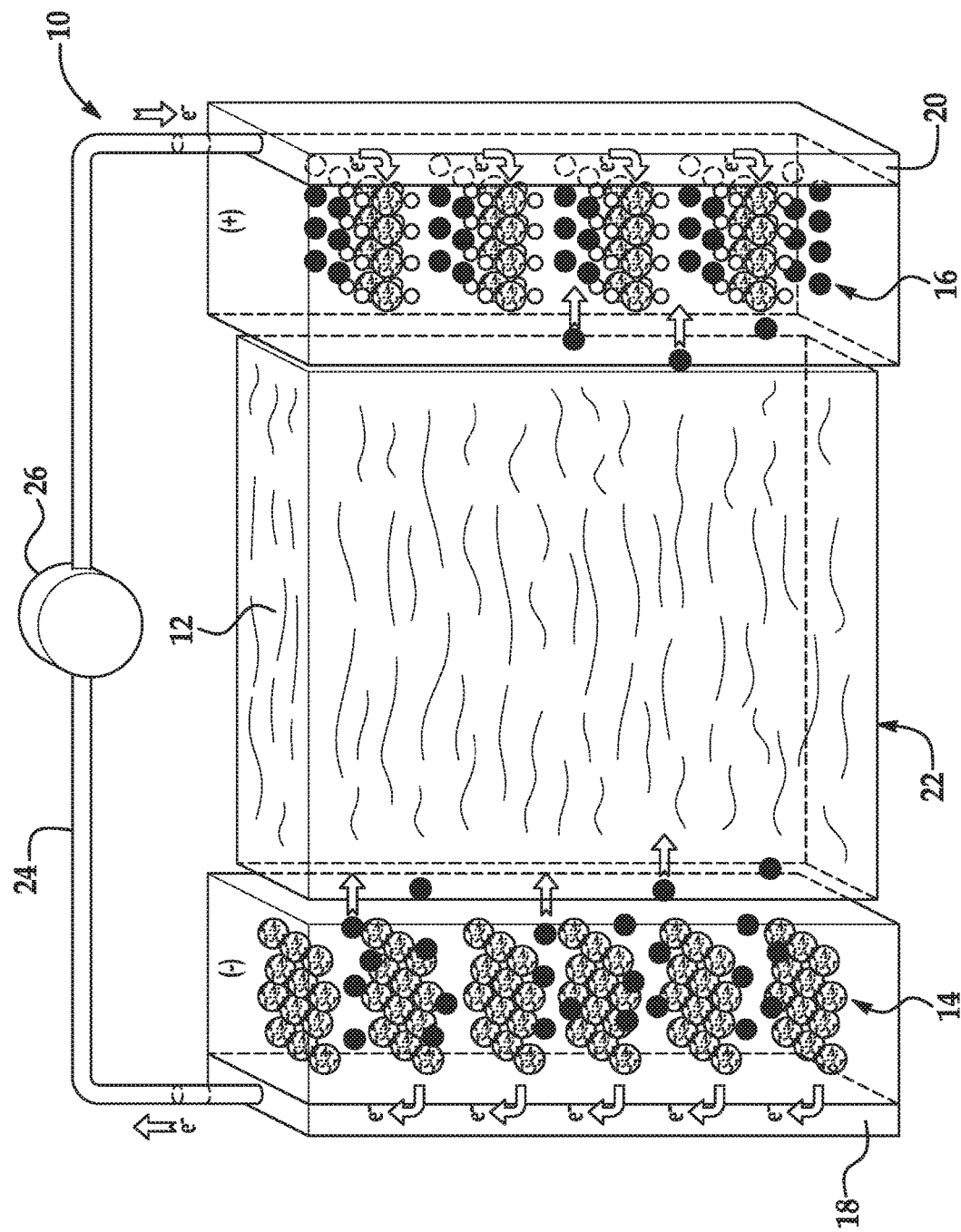

GEL ELECTROLYTES AND PRECURSORS THEREOF

BACKGROUND

Secondary, or rechargeable, lithium-based batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example of the gel electrolyte precursor disclosed herein includes a lithium salt, a solvent, a fluorinated monomer, a fluorinated crosslinker, and an initiator. Another example of the gel electrolyte precursor disclosed herein includes the lithium salt, the solvent, and the fluorinated monomer, wherein the fluorinated monomer is methyl 2-(trifluoromethyl) acrylate, tert-butyl 2-(trifluoromethyl)acrylate, or a combination thereof. A gel electrolyte formed from either example of the gel electrolyte precursor may be incorporated into a lithium-based battery.

An example of the lithium-based battery disclosed herein includes a positive electrode, a negative electrode, a gel electrolyte formed from the gel electrolyte precursor, and a microporous polymer separator soaked in the gel electrolyte. The positive electrode includes a lithium-based active material. The negative electrode includes a silicon-based active material. In an example, the gel electrolyte precursor includes the lithium salt, the solvent, and the fluorinated monomer. The microporous polymer separator is disposed between the positive electrode and the negative electrode.

BRIEF DESCRIPTION OF THE DRAWING

Features of examples of the present disclosure will become apparent by reference to the following detailed description and drawing.

FIG. 1 is a perspective schematic view of an example of a lithium-based battery with an example of the gel electrolyte formed from an example of the gel electrolyte precursor incorporated therein.

DETAILED DESCRIPTION

Lithium-based batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. During charging, lithium ions are inserted (e.g., intercalated, alloyed, etc.) into the negative electrode, and during discharging, lithium ions are extracted from the negative electrode. Each of the electrodes is also associated with respective current collectors, which are connected by an interruptible external circuit that allows an electric current to pass between the negative and positive electrodes.

Traditional liquid electrolytes used in lithium-based batteries may flow in and out of the active material of the negative electrode. The negative electrode active material may experience volume expansion during charging of the battery. More particularly, the lithiation of the negative electrode active material that occurs during charging may cause the active material to expand. For example, a silicon active material, which may be used as the active material of the negative electrode in lithium-based batteries, has a volume expansion of $V_{Si}:V_{Li4.4Si}=1:4.0$, which means approximately 300% volume expansion. As another example, a silicon suboxide active material, which also may be used as the negative electrode active material, has a volume expansion of $V_{SiOx}:V_{LiSiOx}=1:2.3$, which means approximately 130% volume expansion. This volume expansion may create pores in the active material and/or increase the size of existing pores in the active material. When used, traditional liquid electrolytes may flow in and out of these pores and dry out the active material, which may degrade the active material.

When the gel electrolyte formed from an example of the gel electrolyte precursor disclosed herein is used in a lithium-based battery, the gel electrolyte allows the lithium ions to travel through the gel electrolyte without the gel electrolyte flowing in and out of the negative electrode active material. The gel electrolyte has a viscosity (e.g., from about 10 mPa S to about 10,000 mPa S) that is high enough that the gel electrolyte does not flow in and out of the negative electrode active material and low enough that the lithium ions are able to travel through the gel electrolyte. Thus, lithium-based batteries, with the gel electrolyte incorporated therein, are able to charge and discharge without the active material drying out.

A fluorinated monomer alone or the fluorinated monomer in combination with a fluorinated crosslinker and an initiator may be used to cause the gel electrolyte to have the desired viscosity. In an example, the gel electrolyte has a viscosity ranging from about 10 mPa S to about 10,000 mPa S. In some examples, a sufficient amount of the fluorinated monomer is included in the gel electrolyte precursor to cause the gel electrolyte to achieve the desired viscosity without including the fluorinated crosslinker and the initiator in the gel electrolyte precursor. In these examples, the fluorinated monomer may form a polymer and/or to crosslink without the fluorinated crosslinker or the initiator, as a higher quantity of the monomer can polymerize and/or crosslink on its own. In other examples, the fluorinated crosslinker and the initiator are included in the gel electrolyte precursor to cause the fluorinated monomer to form a polymer and/or to crosslink, and thus, cause the gel electrolyte to achieve the desired viscosity.

In an example, the gel electrolyte precursor includes a lithium salt, a solvent, and the fluorinated monomer. In some examples, the gel electrolyte precursor consists of these components with no other components. In another example, the gel electrolyte precursor includes the fluorinated crosslinker and the initiator in addition to the lithium salt, the solvent, and the fluorinated monomer. In some other examples, the gel electrolyte precursor consists of these components with no other components. In still other examples, the gel electrolyte precursor may include additional components, such as additives. Examples of additives that may be included in the gel electrolyte precursor include any suitable lithium battery additive, such as vinylene carbonate (VC), vinyl ethylene carbonate (VEC), propane sultone (PS), etc.

It is to be understood that the gel electrolyte precursor may include a single solvent or multiple solvents. Whether a single solvent or multiple solvents is/are used, the total amount of solvent(s) present in the gel electrolyte precursor may range from about 50 wt % to about 95 wt % (based on the total wt % of the gel electrolyte precursor). The solvent(s) may be any solvent(s) that is/are capable of dissolving the lithium salt. In an example, the solvent(s) may be an organic solvent or a mixture of organic solvents. In some examples, the solvent(s) may be selected from cyclic carbonates (ethylene carbonate (EC), propylene carbonate (PC), butylene carbonate, fluoroethylene carbonate (FEC)), linear carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof.

The gel electrolyte precursor also includes the lithium salt. The lithium salt may be present in the gel electrolyte precursor in amount ranging from about 5 wt % to about 50 wt % (based on the total wt % of the gel electrolyte precursor). Examples of the lithium salt include $LiPF_6$, $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI or lithium bis(trifluoromethylsulfonyl)imide), $LiB(C_2O_4)_2$ (LiBOB), $LiBF_2(C_2O_4)$ (LiODFB), $LiPF_3(C_2F_5)_3$ (LiFAP), $LiPF_4(CF_3)_2$, $LiPF_4(C_2O_4)$ (LiFOP), $LiPF_3(CF_3)_3$, $LiSO_3CF_3$, $LiNO_3$, and mixtures thereof.

As mentioned above, gel electrolyte precursor also includes the fluorinated monomer. The fluorinated monomer will improve the performance of the Si based negative electrode, which can utilize –F related chemicals during battery operation (e.g., –F related chemicals can decompose to LiF). The fluorinated monomer may be included in the gel electrolyte precursor in an amount sufficient to cause the gel electrolyte formed from the gel electrolyte precursor to have the desired viscosity (e.g., from about 10 mPa S to about 10,000 mPa S). The fluorinated monomer may cause the gel electrolyte to achieve the desired viscosity either alone or in combination with the fluorinated crosslinker and the initiator. In examples in which the gel electrolyte precursor does not include the fluorinated crosslinker and the initiator, the fluorinated monomer may polymerize and/or crosslink without the fluorinated crosslinker or the initiator. In examples in which the gel electrolyte precursor does include the fluorinated crosslinker and the initiator, the fluorinated crosslinker and the initiator cause the fluorinated monomer to polymerize and/or crosslink. As such, in some examples, the gel electrolyte includes a polymer network formed from the fluorinated monomer being polymerized and/or crosslinked.

In examples in which the gel electrolyte precursor does not include the fluorinated crosslinker and the initiator, the fluorinated monomer may be included in the gel electrolyte precursor in an amount ranging from greater than 0 wt % to about 20 wt % (based on a total wt % of the gel electrolyte precursor). In examples in which the gel electrolyte precursor does include the fluorinated crosslinker and the initiator, the fluorinated monomer may be included in the gel electrolyte precursor in an amount ranging from about 1 wt % to about 10 wt % (based on a total wt % of the gel electrolyte precursor). In these examples, the fluorinated monomer, the fluorinated crosslinker, and the initiator together may account for from about 2 wt % to about 20 wt % of the total wt % of the gel electrolyte precursor.

In an example, the fluorinated monomer is a fluorinated methylacrylate. Specific examples of the fluorinated monomer include methyl 2-(trifluoromethyl) acrylate, tert-butyl 2-(trifluoromethyl)acrylate, and combinations thereof.

The fluorinated crosslinker (when included) may be present in the gel electrolyte precursor in an amount ranging from about 0.1 wt % to about 5 wt % (based on the total wt % of the gel electrolyte precursor). The fluorinated crosslinker may be any acrylate with two double bonds. Specific examples of the fluorinated crosslinker include 2,2,3,3-tetrafluorobutane-1,4-diacrylate or 2,2,3,3,4,4-Hexafluoro-1,5-pentyl diacrylate.

The initiator (when included) may be present in the gel electrolyte precursor in an amount ranging from about 0.000001 wt % to about 1 wt % (based on the total wt % of the gel electrolyte precursor). Examples of the initiator include azobisisobutyronitrile, dibenzoyl peroxide, and combinations thereof.

The gel electrolyte precursor may be formulated by mixing the various ingredients together at room temperature (e.g., from about 18° C. to about 25° C.). The initial mixture may be a liquid, which enables the gel electrolyte precursor to be injected, or otherwise introduced, into the battery. The liquid is able to penetrate the pores of the separator and the electrodes. In this example, the gel electrolyte forms when the battery is heated to a higher temperature, such as at least 60° C. for at least 1 hour. The heat may initiate the polymerization/crosslinking of the fluorinated monomer to form the polymer network. The formation of the polymer network causes the electrolyte to achieve the desired viscosity (e.g., from about 10 mPa S to about 10,000 mPa S) and become a gel.

As mentioned above, the gel electrolyte formed from the gel electrolyte precursor may be incorporated into a lithium-based battery. FIG. 1 illustrates an example of a lithium-based battery 10 including the gel electrolyte 12. The lithium-based battery 10 shown in FIG. 1 includes, in addition to the gel electrolyte 12, a negative electrode 14, a negative-side current collector 18, a positive electrode 16, a positive side current collector 20, and a porous polymer separator 22 positioned between the negative electrode 14 and the positive electrode 16.

The negative electrode 14 includes at least an active material. The negative electrode 14 may also include a binder material, and a conductive filler. The active material may be any suitable silicon-based active material. The silicon-based active material can sufficiently undergo lithium intercalation and deintercalation, or lithium alloying and dealloying, or lithium insertion and deinsertion, while the negative-side current collector 18 functions as the negative terminal of the electrochemical cell. Examples of the silicon-based active material include crystalline silicon, amorphous silicon, silicon oxide ($SiO_x$, where 0<x≤2), silicon alloys (e.g., Si—Sn—Fe), etc. The silicon active material may be in the form of a powder, particles, etc. ranging from nano-size to micro-size.

The binder material may be used to structurally hold the silicon-based active material together. Examples of the binder material include polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material. Examples of the still other suitable binders include polyvinyl alcohol (PVA), sodium alginate, or other water-soluble binders.

The conductive filler material may be a conductive carbon material. The conductive carbon material may be a high surface area carbon, such as acetylene black or another carbon material (e.g., Super P). The conductive filler material is included to ensure electron conduction between the active material and the negative-side current collector 18 in the battery.

The negative electrode 14 may include from about 5 wt % to 90 wt % (based on the total wt % of the negative electrode 14) of the silicon-based active material and up to 20 wt % (based on the total wt % of the negative electrode 14) of each of the conductive filler and binder material. In an example, the negative electrode 14 includes from about 70 wt % to about 90 wt % of the silicon-based active material, from about 5 wt % to about 15 wt % of the conductive filler material, and from about 5 wt % to about 15 wt % of the binder material.

The negative electrode 14 may be purchased or formed. In an example, the negative electrode 14 may be formed by making a slurry of active material particles, binder material, and conductive filler material in water and/or a polar aprotic solvent (e.g., dimethylacetamide (DMAc), N-methyl-2-pyrrolidone (NMP), dimethylformamide (DMF), dimethylsulfoxide (DMSO), or another Lewis base, or combinations thereof), and/or another suitable solvent.

The slurry may be mixed, and then deposited onto a support. In an example, the support is the negative-side current collector 18. It is to be understood that the negative-side current collector 18 may be formed from copper or any other appropriate electrically conductive material known to skilled artisans. The negative-side current collector 18 that is selected should be capable of collecting and moving free electrons to and from an external circuit connected thereto. The slurry may be deposited using any suitable technique. As examples, the slurry may be cast on the surface of the support, or may be spread on the surface of the support, or may be coated on the surface of the support using a slot die coater.

The deposited slurry may be exposed to a drying process in order to remove any remaining solvent and/or water. Drying may be accomplished using any suitable technique. Drying may be performed at an elevated temperature ranging from about 60° C. to about 150° C. In some examples, vacuum may also be used to accelerate the drying process. As one example of the drying process, the deposited slurry may be exposed to vacuum at about 120° C. for about 12 to 24 hours. The drying process results in the formation of the negative electrode 14.

The positive electrode 16 includes at least an active material. The negative electrode 14 may also include a binder material, and a conductive filler. The active material may be any lithium-based active material that can sufficiently undergo lithium insertion and deinsertion while the positive-side current collector 20 is functioning as the positive terminal of the lithium-based battery 10. One common class of known lithium-based active materials suitable for this example of the positive electrode 16 includes layered lithium transition metal oxides. For example, the lithium-based active material may be spinel lithium manganese oxide ($LiMn_2O_4$), lithium cobalt oxide ($LiCoO_2$), a manganese-nickel oxide spinel [$Li(Mn_{1.5}Ni_{0.5})O_2$], or a layered nickel-manganese-cobalt oxide (having a general formula of $xLi_2MnO_3 \cdot (1-x)LiMO_2$ or (M is composed of any ratio of Ni, Mn and/or Co). A specific example of the layered nickel-manganese-cobalt oxide includes ($xLi_2MnO_3 \cdot (1-x)Li(Ni_{1/3}Mn_{1/3}Co_{1/3})O_2$). Other suitable lithium-based active materials include $Li(Ni_{1/3}Mn_{1/3}Co_{1/3})O_2$, $Li_{x+y}Mn_{2-y}O_4$ (LMO, $0<x<1$ and $0<y<0.1$), or a lithium iron polyanion oxide, such as lithium iron phosphate ($LiFePO_4$) or lithium iron fluorophosphate ($Li_2FePO_4F$), or a lithium rich layer-structure. Still other lithium-based active materials may also be utilized, such as $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$ or NCA), aluminum stabilized lithium manganese oxide spinel (e.g., $Li_xAl_{0.05}Mn_{0.95}O_2$), lithium vanadium oxide ($LiV_2O_5$), $Li_2MSiO_4$ (where M is composed of any ratio of Co, Fe, and/or Mn), and any other high energy nickel-manganese-cobalt material (HE-NMC, NMC or $LiNiMnCoO_2$). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom.

The lithium-based active material of the positive electrode 16 may be intermingled with the binder and/or the conductive filler. The binder may structurally hold the lithium-based active materials and the conductive filler together. Some examples of suitable binders include the binders listed above in reference to the negative electrode 14. The conductive filler ensures electron conduction between the positive-side current collector 20 and the lithium-based active material in the positive electrode 16. The conductive filler may be any of the conductive fillers listed above in reference to the negative electrode 14.

The positive electrode 16 may include the lithium-based active material in an amount ranging from about 60 wt % to about 95 wt % (based on the total wt % of the positive electrode 16), the conductive filler in an amount ranging from about 5 wt % to about 20 wt % (based on the total wt % of the positive electrode 16), and the binder in an amount ranging from about 5 wt % to about 20 wt % (based on the total wt % of the positive electrode 16).

The positive electrode 16 may be purchased or formed. In an example, the positive electrode 16 may be formed in a method similar to the method described above for forming the negative electrode 14, i.e., by making a slurry of active material particles, binder material, and conductive filler material in water and/or a polar aprotic solvent. The slurry may be mixed, and then deposited onto a support. In an example, the support is the positive-side current collector 20. It is to be understood that the positive-side current collector 20 may be formed from aluminum, or any other appropriate electrically conductive material known to skilled artisans. The positive-side current collector 20 that is selected should be capable of collecting and moving free electrons to and from an external circuit connected thereto. The slurry may be deposited and/or dried by any technique described above in reference to the formation of the negative electrode 14.

The porous polymer separator 22, which operates as both an electrical insulator and a mechanical support, is sandwiched between the negative electrode 14 and the positive electrode 16 to prevent physical contact between the two electrodes 14, 16 and the occurrence of a short circuit. In addition to providing a physical barrier between the two electrodes 14, 16, the porous polymer separator 22 ensures passage of lithium ions (identified by the black dots in FIG.

1) through the gel electrolyte 12 filling its pores. This helps ensure that the lithium-based battery 10 functions properly.

The porous polymer separator 22 may be a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the porous polymer separator 22 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the porous polymer separator 22 may be chosen from a combination of the polyolefin (such as PE and/or PP) and one or more of the polymers listed above.

The porous polymer separator 22 may contain a single layer or a multi-layer laminate fabricated from either a dry or wet process. For example, a single layer of the polyolefin and/or other listed polymer may constitute the entirety of the porous polymer separator 22. As another example, however, multiple discrete layers of similar or dissimilar polyolefins and/or polymers may be assembled into the porous polymer separator 22. In one example, a discrete layer of one or more of the polymers may be coated on a discrete layer of the polyolefin to form the porous polymer separator 22. Further, the polyolefin (and/or other polymer) layer, and any other optional polymer layers, may further be included in the porous polymer separator 22 as a fibrous layer to help provide the porous polymer separator 22 with appropriate structural and porosity characteristics. Still other suitable porous polymer separators 22 include those that have a ceramic layer attached thereto, and those that have ceramic filler in the polymer matrix (i.e., an organic-inorganic composite matrix).

As shown in FIG. 1, the porous polymer separator 22 is soaked in the gel electrolyte 12. To soak the separator 22, the gel electrolyte precursor including the lithium salt, the solvent, and the fluorinated monomer (with or without the crosslinker and initiator) may be injected into the pores of the separator 22. The battery 10 may then be exposed to a higher temperature, which causes the gel to form.

As mentioned above, the gel electrolyte precursor includes the lithium salt, the solvent, and the fluorinated monomer and may additionally include the fluorinated crosslinker and the initiator. The lines shown throughout the gel electrolyte 12 in FIG. 1 represent the polymerized and/or crosslinked fluorinated monomer when the fluorinated monomer is included in the gel electrolyte precursor without the fluorinated crosslinker and the initiator, and also represent the polymerized and/or crosslinked fluorinated monomer when the fluorinated crosslinker and the initiator are included with the fluorinated monomer in the gel electrolyte precursor.

As shown in FIG. 1, the lithium-based battery 10 also includes an interruptible external circuit 24 that connects the negative electrode 14 and the positive electrode 16. The lithium-based battery 10 may also support a load device 26 that can be operatively connected to the external circuit 24. The load device 26 receives a feed of electrical energy from the electric current passing through the external circuit 24 when the lithium-based battery 10 is discharging. While the load device 26 may be any number of known electrically-powered devices, a few specific examples of a power-consuming load device 26 include an electric motor for a hybrid vehicle or an all-electrical vehicle, a laptop computer, a cellular phone, and a cordless power tool. The load device 26 may also, however, be an electrical power-generating apparatus that charges the lithium-based battery 10 for purposes of storing energy. For instance, the tendency of windmills and solar panels to variably and/or intermittently generate electricity often results in a need to store surplus energy for later use.

The lithium-based battery 10 may also include a wide range of other components that, while not depicted here, are nonetheless known to skilled artisans. For instance, the lithium-based battery 10 may include a casing, gaskets, terminals, tabs, and any other desirable components or materials that may be situated between or around the negative electrode 14 and the positive electrode 16 for performance-related or other practical purposes. Moreover, the size and shape of the lithium-based battery 10, as well as the design and chemical make-up of its main components, may vary depending on the particular application for which it is designed. Battery-powered automobiles and hand-held consumer electronic devices, for example, are two instances where the lithium-based battery 10 would most likely be designed to different size, capacity, and power-output specifications. The lithium-based battery 10 may also be connected in series and/or in parallel with other similar lithium-based batteries to produce a greater voltage output and current (if arranged in parallel) or voltage (if arranged in series) if the load device 26 so requires.

The lithium-based battery 10 generally operates by reversibly passing lithium ions between the negative electrode 14 and the positive electrode 16. In the fully charged state, the voltage of the battery 10 is at a maximum (typically in the range 2.0V to 5.0V); while in the fully discharged state, the voltage of the battery 10 is at a minimum (typically in the range 0V to 2.0V). Essentially, the Fermi energy levels of the active materials in the positive and negative electrodes 16, 14 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 26 enables an electronic current flow in the external circuit 24 with a direction such that the difference between the Fermi levels (and, correspondingly, the cell voltage) decreases. The reverse happens during battery charging: the battery charger forces an electronic current flow in the external circuit 24 with a direction such that the difference between the Fermi levels (and, correspondingly, the cell voltage) increases.

At the beginning of a discharge, the negative electrode 14 of the lithium-based battery 10 contains a high concentration of intercalated lithium while the positive electrode 16 is relatively depleted. When the negative electrode 14 contains a sufficiently higher relative quantity of intercalated lithium, the lithium-based battery 10 can generate a beneficial electric current by way of reversible electrochemical reactions that occur when the external circuit 24 is closed to connect the negative electrode 14 and the positive electrode 16. The establishment of the closed external circuit 24 under such circumstances causes the extraction of intercalated lithium from the negative electrode 14. The extracted lithium atoms are split into lithium ions (identified by the black dots) and electrons ($e^-$) as they leave an intercalation host at the negative electrode-gel electrolyte interface.

The chemical potential difference between the positive electrode 16 and the negative electrode 14 (ranging from about 2.0V to about 5.0V, depending on the exact chemical make-up of the electrodes 14, 16) drives the electrons ($e^-$) produced by the oxidation of intercalated lithium at the negative electrode 14 through the external circuit 24 towards the positive electrode 16. The lithium ions are concurrently carried by through the gel electrolyte 12 towards the positive electrode 16. The electrons ($e^-$) flowing through the external circuit 24 and the lithium ions migrating across the porous polymer separator 22 in the gel electrolyte 12 eventually reconcile and form intercalated lithium at the positive electrode 16. The electric current passing through the external circuit 24 can be harnessed and directed through the load device 26 until the level of intercalated lithium in the negative electrode 14 falls below a workable level or the need for electrical energy ceases.

The lithium-based battery 10 may be recharged after a partial or full discharge of its available capacity. To charge the lithium-based battery 10 an external battery charger is connected to the positive and the negative electrodes 16, 14, to drive the reverse of battery discharge electrochemical reactions. During recharging, the electrons ($e^-$) flow back towards the negative electrode 14 through the external circuit 24, and the lithium ions are carried by the electrolyte across the porous polymer separator 22 in the gel electrolyte 12 back towards the negative electrode 14. The electrons ($e^-$) and the lithium ions are reunited at the negative electrode 14, thus replenishing it with intercalated lithium for consumption during the next battery discharge cycle.

The external battery charger that may be used to charge the lithium-based battery 10 may vary depending on the size, construction, and particular end-use of the lithium-based battery 10. Some suitable external battery chargers include a battery charger plugged into an AC wall outlet and a motor vehicle alternator.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 50 wt % up to about 95 wt % should be interpreted to include not only the explicitly recited limits of from about 50 wt % up to about 95 wt %, but also to include individual values, such as 55 wt %, 62 wt %, 75.2 wt %, etc., and sub-ranges, such as from about 50 wt % to about 80 wt %, from about 65 wt % to about 85 wt %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A lithium-based battery, comprising:
   a positive electrode including a lithium-based active material;
   a negative electrode including a silicon-based active material;
   a gel electrolyte comprising a polymer network formed from a gel electrolyte precursor, wherein the gel electrolyte precursor includes:
   a lithium salt;
   a solvent; and
   a fluorinated monomer selected from the group consisting of methyl 2-(trifluoromethyl) acrylate, tert-butyl 2-(trifluoromethyl)acrylate, and combinations thereof,
   wherein the fluorinated monomer is incorporated into the polymer network; and
   a microporous polymer separator soaked in the gel electrolyte, the microporous polymer separator being disposed between the positive electrode and the negative electrode.

2. The lithium-based battery as defined in claim 1 wherein the silicon-based active material is silicon nanoparticles, crystalline silicon, amorphous silicon, silicon dioxide ($SiO_2$), silicon suboxide ($SiO_x$, where $0<x<2$), or a silicon alloy.

3. The lithium-based battery as defined in claim 1 wherein the silicon-based active material is present is an amount ranging from about 5 wt % to about 90 wt % based on a total wt % of the negative electrode.

4. The lithium-based battery as defined in claim 1 wherein the gel electrolyte precursor further includes a fluorinated crosslinker and an initiator.

5. The lithium-based battery as defined in claim 4 wherein the fluorinated crosslinker is 2,2,3,3-tetrafluorobutane-1,4-diacrylate or 2,2,3,3,4,4-hexafluoro-1,5-pentyl diacrylate.

6. The lithium-based battery as defined in claim 4 wherein the initiator is azobisisobutyronitrile, dibenzoyl peroxide, or a combination thereof.

7. The lithium-based battery as defined in claim 4 wherein the lithium salt is $LiPF_6$, $LiBF_4$, $LiN(CF_3SO_2)_2$, $LiN(FSO_2)_2$, $LiB(C_2O_4)_2$, $LiBF_2(C_2O_4)$, $LiClO_4$, $LiAlCl_4$, LiI, LiBr, LiSCN, $LiB(C_6H_5)_4$, $LiAsF_6$, $LiCF_3SO_3$, $LiPF_3(C_2F_5)_3$, $LiPF_4(CF_3)_2$, $LiPF_4(C_2O_4)$, $LiPF_3(CF_3)_3$, $LiSO_3CF_3$, $LiNO_3$, or a combination thereof.

8. The lithium-based battery as defined in claim 4 wherein the solvent is dimethyl carbonate, fluoroethylene carbonate, ethylene carbonate, propylene carbonate, ethylmethyl carbonate, diethyl carbonate, butylene carbonate, methyl formate, methyl acetate, methyl propionate, γ-butyrolactone, γ-valerolactone, 1,2-dimethoxyethane, 1,2-diethoxyethane, ethoxymethoxyethane, tetrahydrofuran, 2-methyltetrahydrofuran, or a combination thereof.

9. The lithium-based battery as defined in claim 4 wherein a viscosity of a gel electrolyte that is formed from the gel electrolyte precursor ranges from about 10 mPa·S to about 10,000 mPa·S.

10. The lithium-based battery as defined in claim 4 wherein the fluorinated monomer, the fluorinated crosslinker, and the initiator together account for from about 2 wt % to about 20 wt % of a total wt % of the gel electrolyte precursor.

11. The lithium-based battery as defined in claim 4 wherein:
   the lithium salt is present in an amount ranging from about 5 wt % to about 50 wt % based on a total wt % of the gel electrolyte precursor;
   the solvent is present in an amount ranging from about 50 wt % to about 95 wt % based on the total wt % of the gel electrolyte precursor;
   the fluorinated monomer is present in an amount ranging from about 1 wt % to about 10 wt % based on the total wt % of the gel electrolyte precursor;
   the fluorinated crosslinker is present in an amount ranging from about 0.1 wt % to about 5 wt % based on the total wt % of the gel electrolyte precursor; and
   the initiator is present in an amount ranging from about 0.000001 wt % to about 1 wt % based on the total wt % of the gel electrolyte precursor.

12. The lithium-based battery as defined in claim 1 wherein the fluorinated monomer is present in an amount ranging from greater than 0 wt % to about 20 wt % based on a total wt % of the gel electrolyte precursor.

13. The lithium-based battery as defined in claim 1 wherein a viscosity of the gel electrolyte that is formed from the gel electrolyte precursor ranges from about 10 mPa·S to about 10,000 mPa·S.

* * * * *